United States Patent [19]

Barton, Jr.

[11] 4,300,216
[45] Nov. 10, 1981

[54] MULTI-CHANNEL FISHSCOPE

[76] Inventor: George G. Barton, Jr., Star Rte., Box 180, Harkers Island, N.C. 28531

[21] Appl. No.: 101,836

[22] Filed: Dec. 10, 1979

[51] Int. Cl.³ .............................................. G01S 15/96
[52] U.S. Cl. .................................................. 367/113
[58] Field of Search ......................................... 367/113

[56] References Cited
U.S. PATENT DOCUMENTS 3,696,324  10/1972  Baum ................................... 367/113
3,701,089  10/1972  Cowan ................................. 367/113
4,104,609  8/1978  Minegishi et al. ................... 367/113

*Primary Examiner*—Richard A. Farley
*Attorney, Agent, or Firm*—Mills & Coats

[57] ABSTRACT

The present invention entails a multi-channel fishscope that includes an expandable microprocessor unit that is adapted to receive echo profile signals from one or more transmitter-receiver modules and through voltage comparatory networks generating an output video signal that is directed to a CRT of a television monitor. There the echo profiles are transformed into signature traces on the TV monitor that represent fish or other target objects. By the provision of a search/scan module with timing control provisions, the depth of the traces is scaled onto the TV monitor in order to indicate depth and relative position.

7 Claims, 17 Drawing Figures

UNILATERAL ECHO TRACE

MULTI-CHANNEL FISHSCOPE

The present invention relates to the oscilloscopic displaying of submarine sonic echoes and more particularly to a multi-channel fishscope that is adapted to present oscilloscopically acoustical echoes derived from fish or other target objects as traces on a cathode ray tube.

BACKGROUND OF THE INVENTION

Fishscopes known today are designed to generate an oscilloscopic trace on a screen or TV monitor where the trace is derived from and represents a fish or other target object at a certain depth. Earlier fishscopes utilized electrostatically deflected oscilloscope tubes. But in recent years, fishscopes have moved to using magnetically deflected tubes of the type commonly found in small TV receivers.

Generally then, fishscopes of the prior art employ standard oscilloscope technology inasmuch as the CRT electron beam is slowly deflected along one cartesien axis in order to display depth and is rapidly deflected along the orthogonal axis to display the echo signature trace. It will be appreciated that the echo signature trace can appear as a bilateral wave envelope representing the peak to peak high frequency excursion of the echo signal, or can be rectified and filtered to produce a unilateral trace of the echo profile.

More specifically, in fishscopes of the prior art, one can expect to find the same designed such that the cathode ray tube is magnetically deflected by conventional deflection yokes. To provide horizontal deflection of the electronic beam rapidly enough to present a clean echo image requires that the yoke be fed approximately two amps at 60 volts peak to peak at 15 to 30 kHz. To perform this function, the signal produced by a receiver amplifier at some frequency (X) must be summed in a tuned mixer amplifier with a local oscillator (Y) to produce a difference frequency of say, for example, 20 kHz (Z). This signal must be processed through an additional tuned amplifier to reduce the X and Y frequencies to a point where they have no effect on the output drive amplifier. The output drive amplifier instead of operating between plus and minus 30 volts which would be wasteful of power, normally operates at 12 to 24 volts and is normally transformer or push-pull transistor coupled to the yoke. To further simplify the system, the yoke is series resonated to 20 kHz with a series capacitor to drop the driving voltage to normal buss voltage.

To operate a fishscope as described above requires a substantial amount of expensive equipment such as a separate high voltage power supply, an amplifier to produce proper yoke frequencies, a second filter amplifier, and a power amplifier capable of generating two amps of signal current. In the end, these requirements necessitate a complex and expensive amplifier, an expensive high voltage power supply and a high current power supply to supply the yoke amplifier.

Beyond the above, conventional fishscopes of the prior art have other disadvantages. Among these disadvantages are that under normal circumstances only one echoing system and its attendant trace can be presented at one time. Further, the electronic beam is not normally blanked except during retrace causing a continuous line to appear on the scope face. In addition, as a general rule, no information other than the oscilloscopic trace can be displayed on the CRT tube without extensively modifying the tube construction. It is also known that electrostatically deflected CRT'S are normally dim and require high voltage deflecting potentials. Likewise, magnetically deflected CRT'S requires high yoke current to generate high frequency beam deflection.

SUMMARY OF INVENTION

The present invention presents a fishscope that differs from fishscopes of the prior art particularly in the horizontal deflection system and method for generating the echo trace. Generally the fishscope of the present invention is of a multi-channel type and can be said to basically comprise four inter-related systems or units: (1) a rastered display module, (2) a microprocessor, (3) a transmitter-receiver module, and (4) a depth or search/scan timing module.

Generally, the transmitter-receiver module through a transducer functions to emit ultrasonic sound through the area or medium being explored and then acts to detect and amplify echo signals from fish, or other target objects. The received reflected echo signals, referred to as echo profile signals, are then directed to a microprocessor where the respective echo profile signals are amplified and a positive and negative voltage profile is generated therefrom. The positive and negative voltage profiles are then directed to a voltage comparator circuit that compares the voltage profiles with a reference voltage, and then generates an output video signal that is representative of the object giving rise to the echo profile signal received. Essentially, the microprocessor processes the echo profile signal received from the transmitter-receiver module in such a manner that the same is suitable to be directed to a rastered screen display. Thus, the fishscope of the present invention is designed to present signature traces representative of fish or other target objects or even the bottom, on the rastered display as a result of the output fed from the microprocessor to the rastered video monitor. In order to assure that the respective signature traces are scaled appropriately on the rastered format, the present fishscope is provided with a depth or search/scan module that appropriately positions the signature traces on the display to reflect proper depth and relative location.

It is, therefore, an object of the present invention to provide a sonic type fishscope that has the capability of producing clear echo traces, representative of fish and other target objects, on a rastered format.

Still a further object of the present invention is to provide a sonic type fishscope wherein horizontal deflection and high voltage generation are accomplished with fly-back transformer circuitry, thereby meaning that both the yoke drive current and high voltage are produced with an inexpensive high efficiency transformer as contrasted with conventional system utilized by fishscopes of the prior art.

Another important object of the present invention resides in the provision of a fishscope that utilizes one or more microprocessors for processing echo profile signals for presentation on a rastered format wherein a plurality of microprocessors can be utilized to present a plurality of traces in side by side relationship on the rastered format. Such will enable spectral analysis through the emission of multi-frequencies of selected areas to better appreciate the size and species of fish detected, and will enable the use of a plurality of transducers for azimuthal detection of fish echoes over a relatively large area.

Another object of the present invention resides in the provision of a fishscope of the basic character described above wherein the video signal can be presented as white on black or black on white.

Another object of the present invention is to provide a sonic type fishscope of the character described above that is particularly suited to be used with any size CRT.

It is also an object of the present invention to provide a sonic fishscope with a rastered format as referred to above, that is capable of generating and displaying alpha-numeric information along with the echo traces.

Still a further object of the present invention is to provide a sonic type fishscope of the character described above that has the capability of being adjusted so as to present any one of a plurality of distinct oscilloscopic type traces.

In this regard, it is an object of the present invention to provide a fishscope of the character described above that has the capability of generating a bilateral echo trace, a unilateral echo trace, a unilateral echo profile, or a bilateral signal profile.

A further object of the present invention resides in the provision of a fishscope of the basic character referred to above that is susceptible to receiving digital memory matricies for flicker-free display of echos and alpha-numerics.

Yet another object of the present invention resides in the provision of a fishscope of the basic character described above that can easily be interfaced with other sounding equipment and devices, for example, depth recorders and sonors, so as to affect oscilloscopic analysis of echoes.

Other objects and advantages of the present invention will become apparent from a study of the following description and the accompanying drawings which are merely illustrative of the present invention.

MULTI-CHANNEL FISHSCOPE

Before beginning a detailed description of the multi-channel fishscope of the present invention, it will be beneficial to first view the basic components or sub-systems of the present fishscope. In this regard, the fishscope of the present invention can be viewed as being comprised of four cooperative and inter-related systems or units. With respect to FIG. 1A, these four systems or units are shown therein.

First, the fishscope includes a display module 10 that is in the form of a rastered television monitor that is magnetically deflected and which as will be understood from subsequent portions of this disclosure is horizontally deflected at an line rate of 15-16 kHz by a fly back transformer and associated switch network.

Secondly, the fishscope of the present invention includes a search/scan module 12 that is comprised of two separate and independent low frequency timing chains for controlling vertical deflection and determining depth of the search or scan. As will be understood from the following disclosure, one timing chain is referred to as a search mode and is utilized for locating echoes from zero feet to some selected maximum depth. The second timing chain is referred to as a scan mode and is utilized for scanning echoes in some 25 to 50 foot intervals starting at a selected scan depth from zero feet to say, for example, 990 feet.

A third key sub-system of the fishscope of the present invention comprises a microprocessor 14 that utilizes a pair of voltage comparators that are fed with positive and negative detected echo profiles. The microprocessor compares the echo profiles with a sawtooth horizontal signal and produces an output that makes up a video signal that is subsequently processed through a video amplifier and contrast control, after which the same is directed to the cathode of a CRT.

Finally, the fishscope of the present invention includes a transmitter-receiver module 16 that functions to generate and amplify sub-marine sonic echoes for transmission to the microprocessor 14.

THE TRANSMITTER-RECEIVER MODULE

Figure 1:
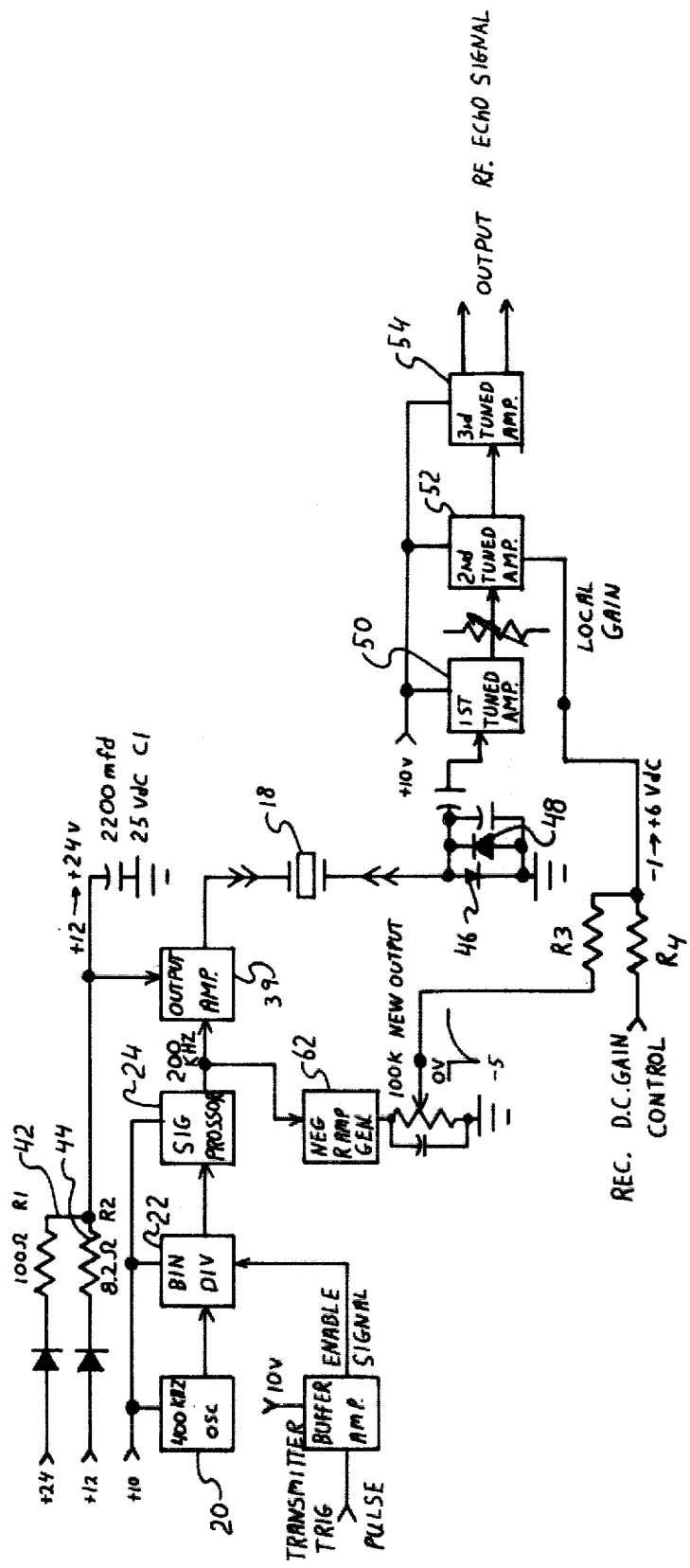
FIG. 1 is a diagrammatic block diagram of components comprising the transmitter-receiver module.
Figure 1A:
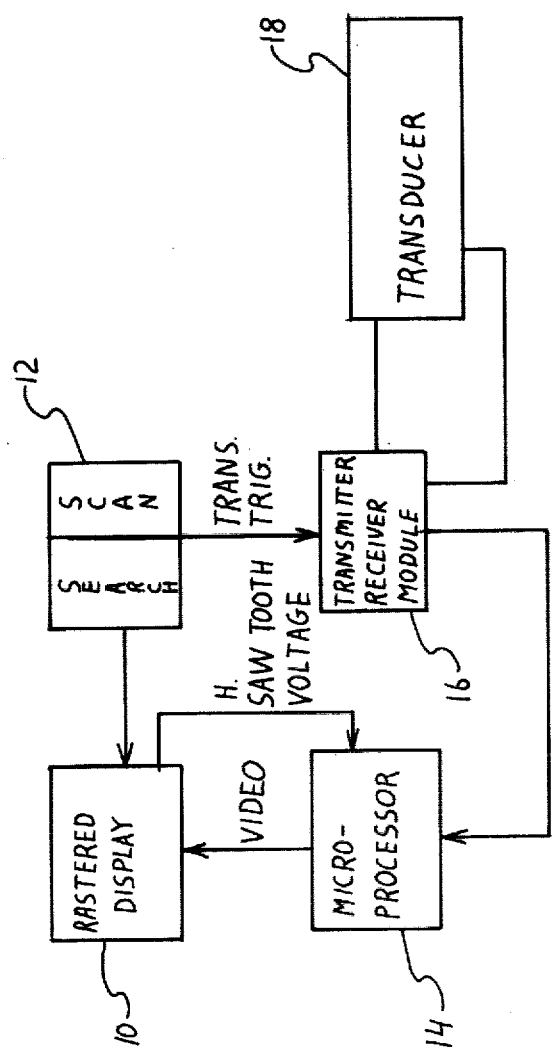
FIG. 1A is a schematic block diagram illustrating the basic components and sub-systems of the fishscope of the present invention.

With respect to the transmitter-receiver module 16 schematically illustrated in FIG. 1, this module can be disposed externally and remote from the display module or television monitor 10. Normally transmitter-receiver module 16 would be coupled to display module 10 via a multi-conductor cable and to a transducer 18 via a two conductor shielded cable.

Viewing transmitter-receiver module 16 in more detail, it is seen that the same includes a master oscillator 20 that in the preferred embodiment disclosed herein is a 400 kHz oscillator. Oscillator 20 is a continuously energized L/C CMOS logic base oscillator operating at a minimum of two times the transducer frequency.

Oscillator 20 is directly coupled into the clock terminal of a binary divider 22 with sufficient number of stages to generate the proper transducer frequency. In the present case, since the master oscillator 20 is of a 400 kHz frequency, it follows then that the available binary frequencies would be 200 kHz, 100 kHz, 50 kHz, 25 kHz or 12.5 kHz. It should be pointed out that in the event a transducer of a different frequency be employed, then the master oscillator would be adjusted to a binary multiple of that frequency.

Binary divider 22 is held in a reset state except during a selective period of time that is referred to as the transmit interval. In practice, the binary divider 22 is actuated by a transmitted trigger pulse from a selected source, that is disclosed subsequently herein, that acts to enable the divider 22, and once enabled, divider 22 generates a wave train or burst at some binary subharmonic of the master oscillator frequency. Upon the termination of the transit pulse directed to the binary divider 22, the binary divider returns to the reset state and the wave train or burst is terminated.

Figure 2:
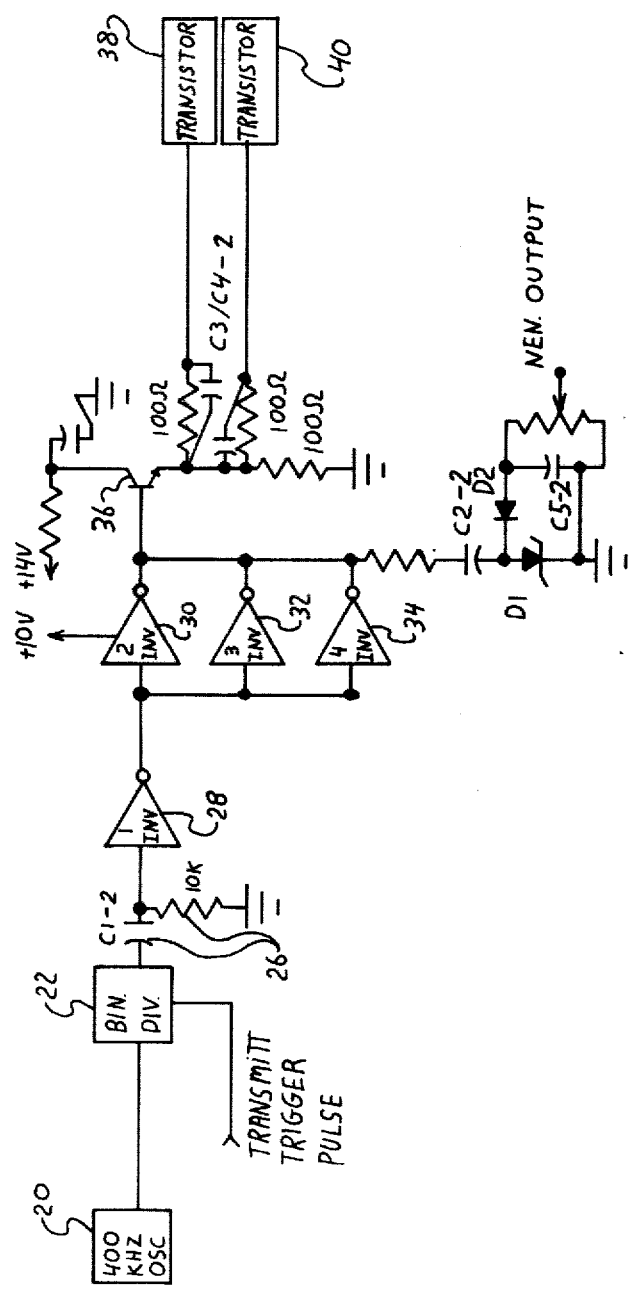
FIG. 2 is an electrical schematic of a transmitter drive circuit forming a part of the transmitter-receiver module.

The generated wave train or burst emitted from binary divider 22 is then directed into a signal processor unit indicated by the numeral 24 in FIG. 1 and shown in more detail in FIG. 2. Viewing FIG. 2 and the signal processor unit 24 in more detail, it is seen that the wave train or burst is first passed through a high pass differentiating R-C network 26 to reduce the duration of the positive going drive signals to improve efficiency and to reduce thermal load and current requirements. After passing through the differentiating network 26, the signal energizes the input terminal of a CMOS inverter 28, that in this embodiment has a transfer point of 50 percent of VDD. The output of inverter 28 is in turn connected to three input CMOS inverters 30, 32 and 34. The output of inverters 30, 32 and 34 drives the base of an NPN emitter follower amplifier 36. Output of amplifier 36 is R/C coupled to the bases of two parallel output transistors 38 and 40 which drive output amplifier or transformer 39, as viewed in FIG. 1.

The primary windings of output transformer 39 is fed from two voltage sources, a 12-volt and 24-volt source via a diode OR circuit and two dropping resistors, each of the respective two circuits being collectively referred to in FIG. 1 by numerals 42 and 44. The 12-volt source establishes the minimum output power of approximately 50 watts RMS. The 24-volt source provides for a maximum output power of 200 watts when operating with a low pulse period at maximum depth. The voltage appearing at the output terminals of transformer 39 is a function of the time constant determined by R1 and C1 in FIG. 1. Still with respect to the output transformer 39, one terminal of the output secondary is grounded while the other is directly coupled to one terminal of the transducer 18. The other terminal of the transducer is coupled to a gamma network shown in FIG. 1 and shown in more detail in FIG. 3. The peak to peak voltage appearing at the terminal of the transducer 18 where the gamma matching network is connected, is limited by two inverted limiting diodes 46 and 48, and in this preferred embodiment the voltage at this point of reference is limited to approximately two volts.

Figure 3:
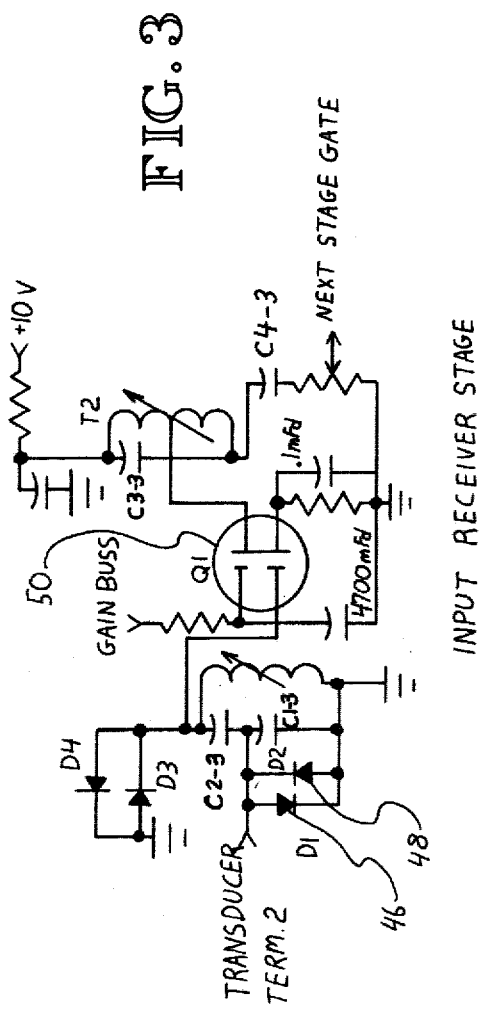
FIG. 3 is an electrical schematic of an input receiver stage forming a part of the transmitter-receiver module.

Referring to the receiver input gamma matching network as illustrated in FIG. 3, it is seen that this network includes C1-3, C2-3, and T-1. This allows accurate impedance matching of this circuit with respect to transducer 18. In addition, this gives a voltage gain in this network of 5-10 which effectively increases the sensitivity by a relatively large factor in a passive manner. The output signal of the gamma matching network just discussed is directly coupled to Gate 1 of the first of a series of dual Gate MOSFET transistor amplifiers. Gate 1 of first MOSFET transistor 50 is limited to a plus or minus 1 volt excursion by diodes D3 and D4, as illustrated in FIG. 3. The drain of this first MOSFET transistor 50 is coupled into a tapped inductor T-2 resonated to the transducer 18 frequency by a capacitor C3-3. Output terminal of inductor T-2 is coupled to a potentiometer R-1 through capacitors C-4. Potentiometer R-1 essentially serves two purposes. First, it has the same impedance of the preceding tuned amplifier and, therefore, broadens its frequency response. Secondly, the wiper of R1-3 feeds Gate 1 of the next succeeding stage allowing the gain of the receiver amplifier to be set at a specific standard or level.

Figure 4:
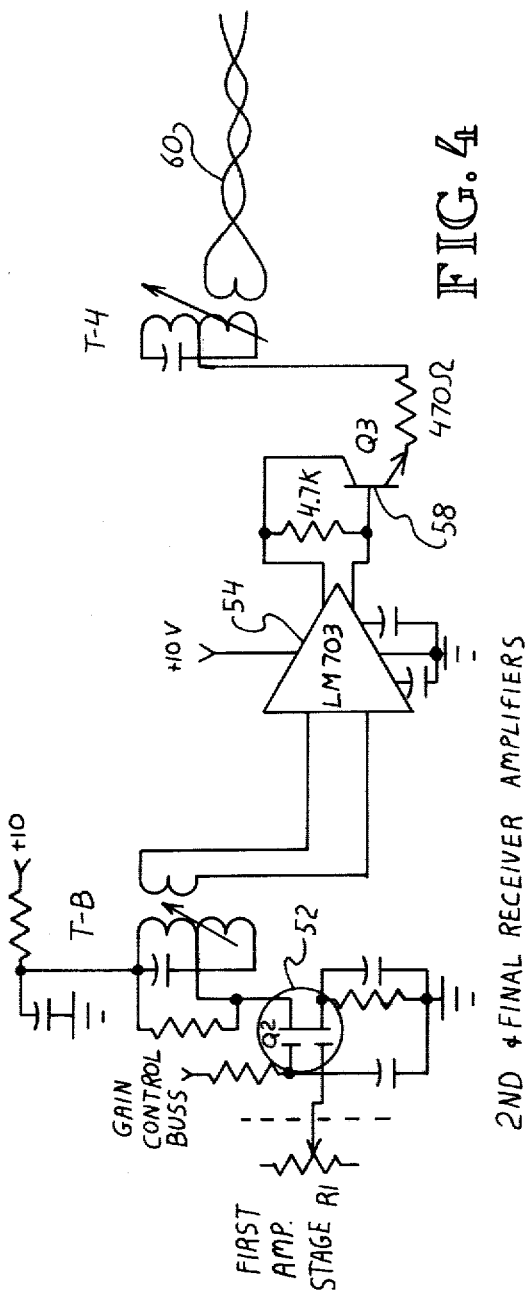
FIG. 4 is an electrical schematic of the second and final receiver amplifier of the transmitter-receiver module.

Referring to FIG. 4, second tuned amplifier 52 is also a MOSFET dual Gate transistor driving a tuned tapped transformer T-3. The output of transformer T-3 is derived through a secondary winding with an impedance equal to that appearing at the tap. The tap is shunted by a resistor equal to the tap impedance.

The secondary winding of transformer T-3 is directly coupled to an integrated circuit amplifier chip 54 such as an LM 703. The output of chip 54 is coupled to a final output transformer T-4 by a NPN emitter follower amplifier 58 to match the output impedance, which in the case of the preferred embodiment illustrated herein would be 500 ohms. This allows an output signal to appear across the terminals of the secondary winding of transformer T-4 and this resulting output signal is adapted to drive a twisted pair 60 which again in this preferred embodiment would comprise a 500 ohm balanced line.

Controlling Gain is accomplished by biasing Gate 2 of both the first and second stage receiver amplifiers 50 and 52 by the provision of a remote potentiometer that would be associated with the display module or TV monitor 10 to be discussed hereafter in detail. This potentiometer would operate between 0 and +6 volts.

In order to reduce the Gain for echoes appearing at shallow depths, a secondary negative biasing ramp is generated in the transceiver module by the wave train or driving burst at the output terminals of inverters 30, 32 and 34. This negative ramp generator, referred to by numeral 62 in FIG. 1, produces a signal that is referred to as NEN (near echo normalizer) which is summed with the 0 to +6 volt DC Gain setting from the display module 10 by the two summing resistors R3 and R4, and this causes the Gain to exponentially increase as the depth increases.

Therefore, generally summarizing the transmitter-receiver module 16 just discussed and illustrated in FIGS. 1 through 4, it is appreciated that the transceiver can assume a remote location and can be placed up to several thousand feet from the display module 10. In addition, the transmitter-receiver module 16 requires one ground buss, two power busses, (+12 and 24 volts), one transmitter control buss which determines the period and pulse width of the transmitter burst, one 0 to +6 v. d.c. Gain control buss, and one twisted pair of 500 ohm balanced receiver transmission lines.

MICROPROCESSOR

Figure 5:
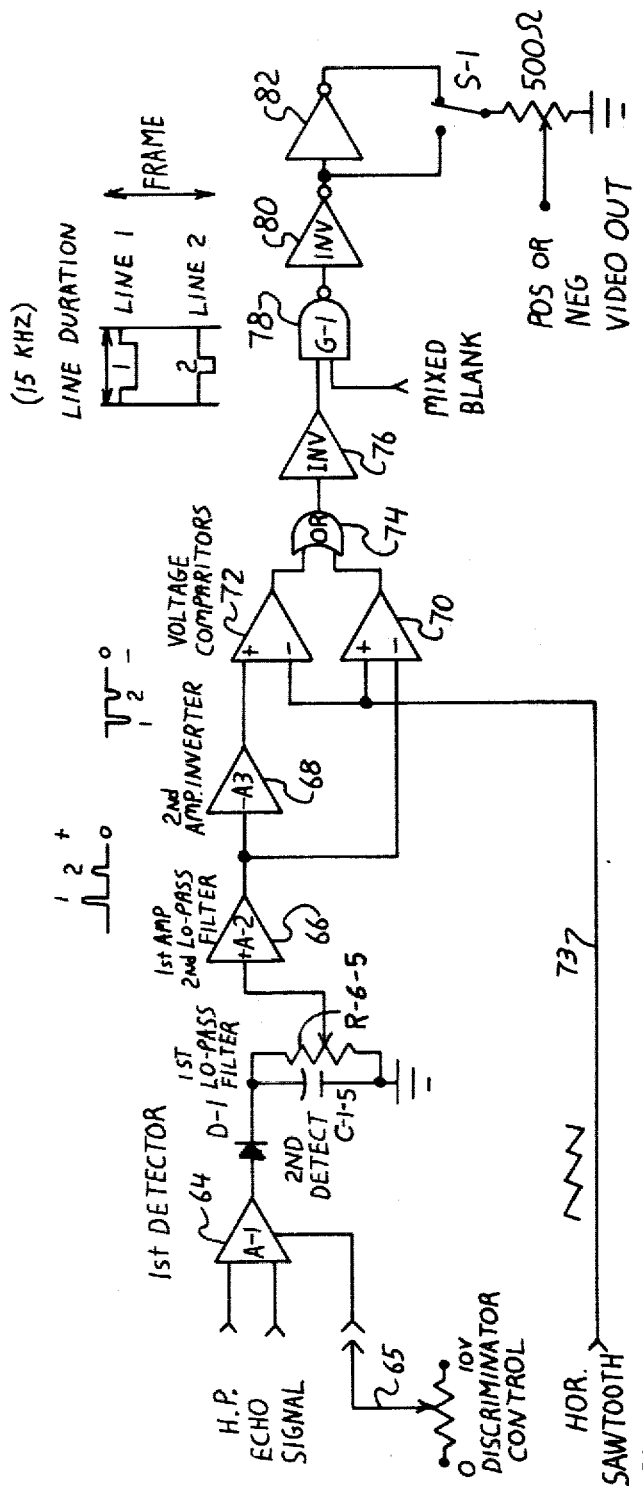
FIG. 5 is a basic schematic illustration of the microprocessor forming a sub-system of the present fishscope.
Figure 6:
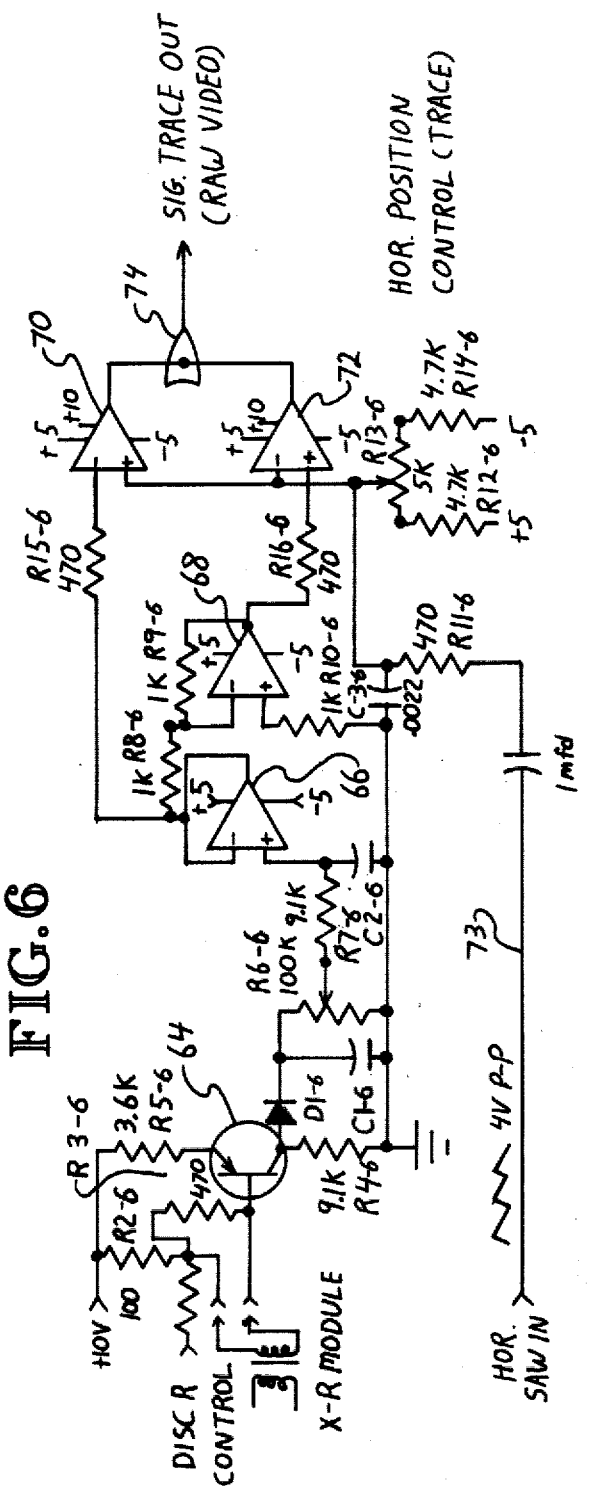
FIG. 6 is an electrical schematic of a portion of the microprocessor showing that part of the sub-system relating to signal processing and trace generation.

With respect to FIGS. 5 and 6, and in particularly FIG. 6, the microprocessor unit or system 14 is illustrated therein and as will be more fully understood from subsequent portions of this disclosure acts to process echo signals received and to generate traces on the display module 10.

Viewing microprocessor 14, it is appreciated that a high frequency echo signal is normally introduced into a first amplifier-discriminator 64 through a twisted pair 500 ohm line isolated from ground. Referring specifically to FIG. 6, it is seen that the transmission line is terminated by a 470 ohm resistor R-3-6 which is coupled to the base of a PNP transistor or amplifier 64 and into a biasing network including a 100 ohm sinking resistor R-2-6 and a 1.3K ohm source resistor R-1-6. The input terminal voltage of source resistor R-1-6 can be adjusted and varied from 0 to +10 v. by an external potentiometer, referred to as a DISCRIMINATOR 65 (FIG. 5), which is adapted to generate a base bias of from 0 to −0.8 volt on transistor or amplifier 64. This establishes a minimum signal voltage which causes transistor 64 (FIG. 6) to become active and to consequently generate an output signal across an associated collector resistor R-4-6. This circuit just referred to allows discrimination against low level noise and small echoes.

Continuing to refer to FIG. 6, the signal appearing across collector resistor R4-6 is a pulsating positive going signal which is further rectified by a diode D1-6 which charges C1-6. D1-6, C1-6 and D6-6 comprise a first stage low-pass filter. It is to be appreciated that potentiometer R6-6 also serves as a control for controlling the trace width. The wiper of potentiometer R6-6 drives a second low-pass filter comprising R7-6 and C2-6 which filters out the final vestiges of the signal frequency leaving only the low frequency echo profile. C1-6 and C2-6 are related to the signal frequency inasmuch as C (PICOFARADS) = 100,000/frequency kHz. The signal appearing at the output terminal of R7-6 is coupled to a noninverting amplifier 66 which is simply operating in a voltage follower mode, i.e., Gain = 1. The output of amplifier 66 drives a second operational amplifier 68 acting as a unity Gain inverting amplifier. First amplifier 66 generates a positive echo profile and second amplifier 68 generates a negative profile (referenced to ground). These two echo profiles are directed into two separate voltage comparators 70 and 72 through a pair of isolating resistors R15-6 and R16-6 (FIG. 6). The positive echo profile signal is coupled into the negative terminal of comparator 70 while the negative profile signal is directed into the positive terminal of the other comparator 72.

Still referring to FIG. 6, the remaining two terminals of the voltage comparators 70 and 72 are fed a d.c. bias and a 15-16 kHz negative going sawtooth signal of approximately 4-6 v. peak to peak and synchronized with the TV raster of the display module 10. The d.c. bias generated by R13-6, R12-6 and R14-6 establishes the central transition point for the trace. R13-6 is referred to as a horizontal position control.

Figures 7, 8:
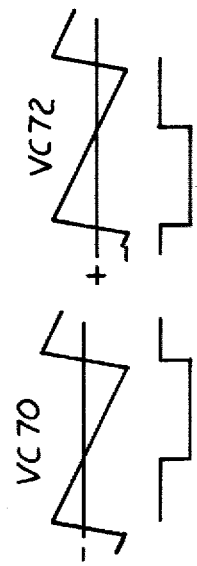
FIG. 7 is a schematic illustrating the response of one voltage comparator of said microprocessor with respect to a reference signal.
FIG. 8 is a schematic illustration of the response of a second voltage comparator with respect to the same reference signal.

In the circuit illustrated in FIG. 6, as long as the echo profile signal appearing at the negative terminal of voltage comparator 70 is less than the horizontal sawtooth voltage on its positive terminal, the output terminal of voltage comparator 70 will be positive (FIG. 7). As the sawtooth signal decreases in amplitude and arrives at a voltage equal to the signal voltage on the negative terminal, voltage comparator 70 will energize and its output terminal will go negative deenergizing one input of an OR Gate 74.

With respect to voltage comparator 72, it is seen that the output of this comparator will be negative until the saw tooth voltage has dropped to a level below the triggering level of voltage comparator 70. By subjecting the output of these two voltage comparators 70 and 72 to OR Gate 74, one can obtain a negative pulse whose width is a function of the instanteous voltage difference between the outputs of amplifiers 66 and 68. These negative pulses when processed in a video amplifier and presented on the rastered TV format of the display module 10 will display an oscilloscopic reproduction of the echo trace or envelope.

Figure 9:
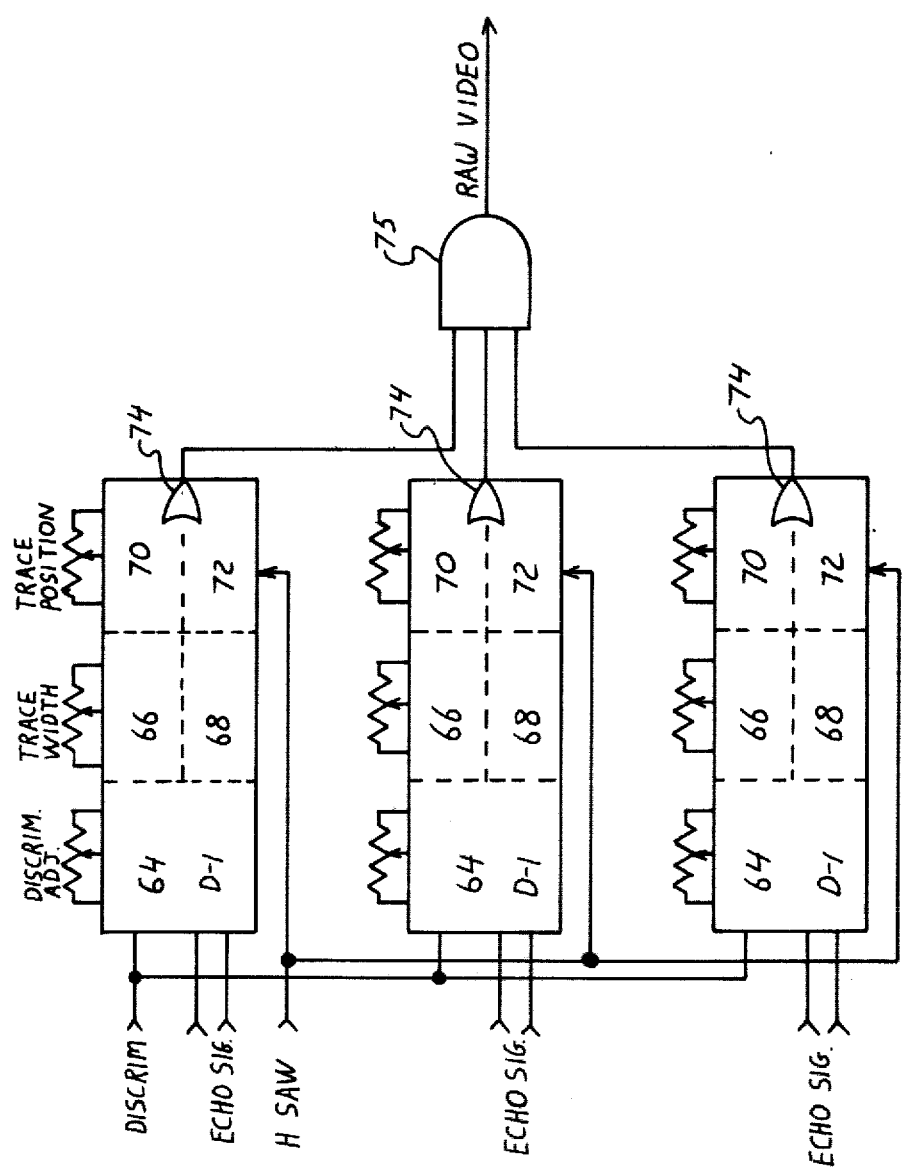
FIG. 9 is a schematic illustration showing a plurality of microprocessors coupled together to form a multi-channel trace presentation.

With reference to FIG. 9, there is illustrated a multichannel oscilloscopic presentation that is designed to display a plurality of separate and distinct traces on the rastered format of the display module 10. In the case illustrated herein, three microprocessors as just described and illustrated in FIGS. 5 and 6 are operatively coupled together by coupling respective Or Gates 74 to a multiple input AND Gate 75 that is adapted to sum all the channels into one video signal and to present the multi-channel data or information as separate and distinct traces on the rastered format of the display module 10.

Figure 10:
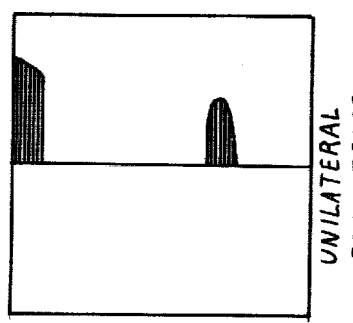
FIG. 10 is a diagrammatic illustration illustrating a unilateral echo trace.

In certain situations, it may be desirable to modify the outputs of respective microprocessors. In this regard, should the signal input to voltage comparator 70 be grounded and the signal input to comparator 72 be coupled to the negative or inverting amplifier 68, the output of OR Gate 74 will resemble that depicted in FIG. 10.

Figure 11:
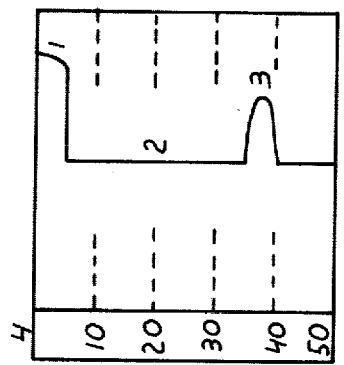
FIG. 11 is a diagrammatic illustration illustrating rectified and filtered signal to produce a unilateral trace of an echo profile.
Figure 12:
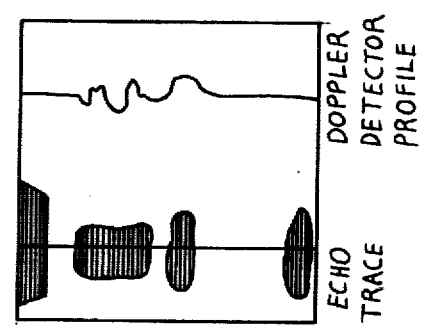
FIG. 12 is another diagrammatic illustration of echo traces produced by the fishscope of the present invention.

Should the signal input of voltage comparator 70 be coupled to the positive or noninverting signal and the signal input terminal of comparator 72 be grounded, then a mirror image trace will be generated. Should the output of OR Gate 72 be processed through a one shot multi-vibrator, a line or profile trace will be generated such as illustrated in FIG. 11.

Where a signal of varying amplitude and polarity is directed unto the positive terminal of a single voltage comparator and the negative terminal fed with a horizontal sawtooth signal and the output of the voltage comparator coupled to a one-shot multi-vibrator, the multi-vibrator will generate a series of narrow pulses of raw video generating a vertical line on the TV raster whose horizontal position represents the input signal amplitude and polarity. This is illustrated in FIG. 12.

VIDEO PROCESSOR

Figure 13:
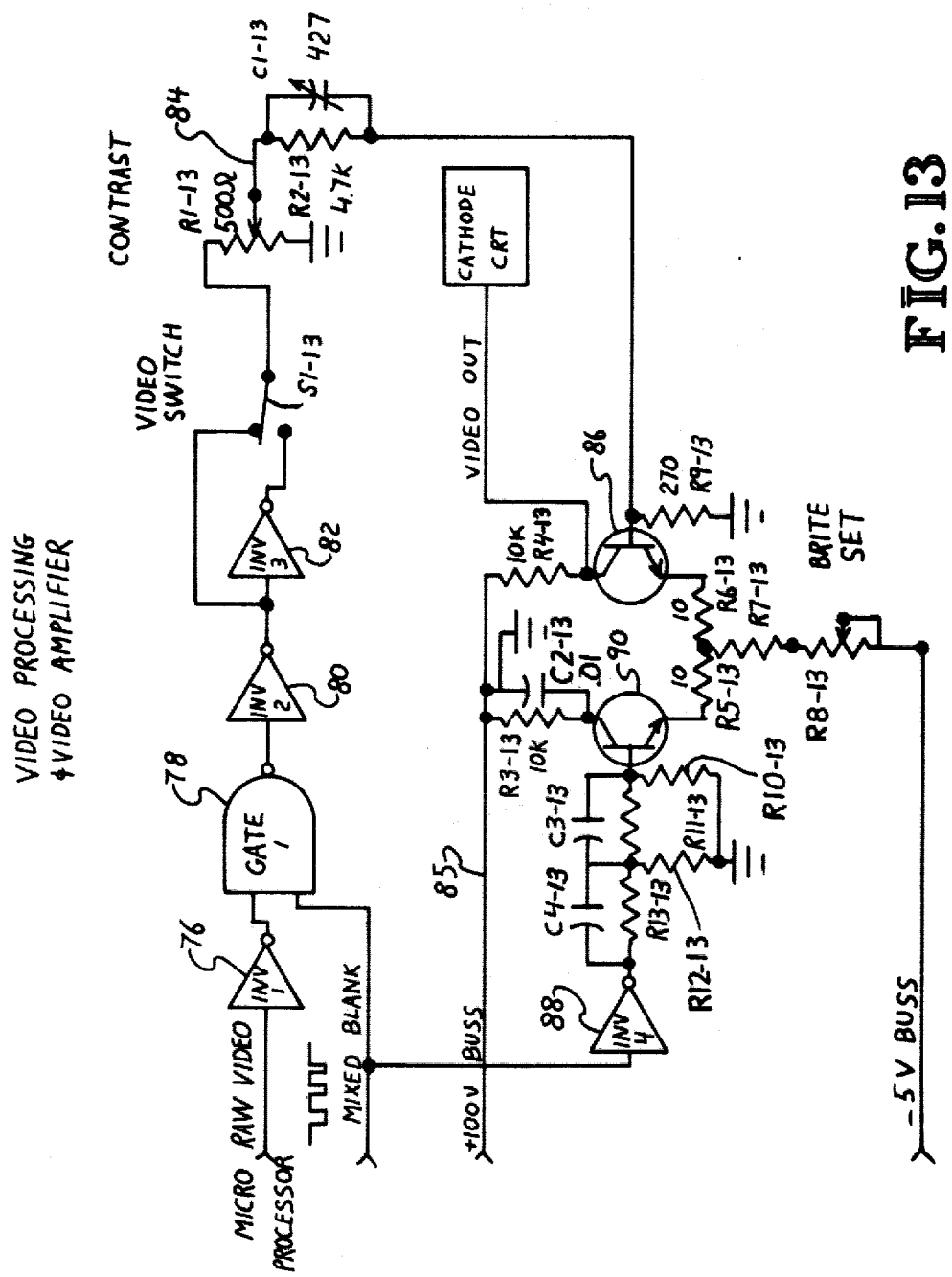
FIG. 13 is a diagrammatic illustration of the video processing and video amplifier of the fishscope of the present invention.

From the microprocessor, discussed hereinabove, an output signal in TTL/CMOS format is produced and because of this format the signal can be processed in digital Gates and inverters. The signal referred to is normally negative going and as particularly illustrated in FIG. 13 is first inverted in a TTL NAND Gate 76. The output of Gate 76 is directed to one input of a two input NAND Gate 78, while the other input is fed a mixed blanking signal which is both horizontal and vertical. Gate 78 produces an output that is suppressed during blanking time so as to result in a clean video signal active only during the unblanked line and frame periods. The resulting signal is then processed through two tandem high speed digital inverters 80 and 82. Continuing to refer to FIG. 13, it is seen that by selectively choosing the output of either inverter 80 or 82 through a SPDT switch S1-13, either positive (white) or negative (black) video can be established at the input terminal of a contrast control 84. The wiper of control 84 is directed to an R/C (R2-13 and C1-13) frequency compensating network and into one terminal of an output video amplifier 86 which drives the cathode of the CRT.

Video amplifier 86 is of a d.c. differential design so as to preclude unbalance loading of its power supply during extended blanking periods and further to allow switching from white video to black video without altering the contrast and brightness control adjustments. Since all input signals to amplifier 86 are derived from digital Gates referenced to ground, both inputs of this amplifier are also referenced to ground to allow d.c. video and blanking signal coupling. The mixed blanking signal is derived through an inverter 88 and processed through a high frequency peaking network including R10-13, R13-13, C3-13 and C4-13, and further coupled to the differential input of a second amplifier 90. The collector of transistor or amplifier 90 is by-passed to ground through a capacitor C2-13 to further improve the high frequency response of the amplifier. All of the above discussion relating to the video amplifier and video processing is illustrated in FIG. 13. With respect to FIG. 14, there a horizontal sweep generator is illustrated and this portion of the present disclosure is based on conventional television solid-state switching and fly-back transformer technology. Reviewing the horizontal switch generator as illustrated herein, a master oscillator 100 designed to generate a 15–16 kHz signal is provided and so biased as to produce a square wave output with a 40 percent OFF time and 60 percent ON time. In the embodiment disclosed, it is contemplated that the master oscillator 100 would be of the NE 555 I.C. timer type. The generated output wave of oscillator 100 is directed through two inverters 102 and 104 and on through a horizontal drive amplifier 106 which in turn drives a switching transistor 108 that directly drives a fly-back transformer 110. Fly back transformer 110 generates a +10 KV pulse and a +100 volt pulse which after rectification and filtering, drives the CRT and other dependent circuits. The positive going 100 volt pulse, for example, is directed to line 85 in FIG. 13, and as such, the collector of amplifier 90 feeds a 100K ohm resistor for the external generation of the horizontal blanking signal.

Figure 14:
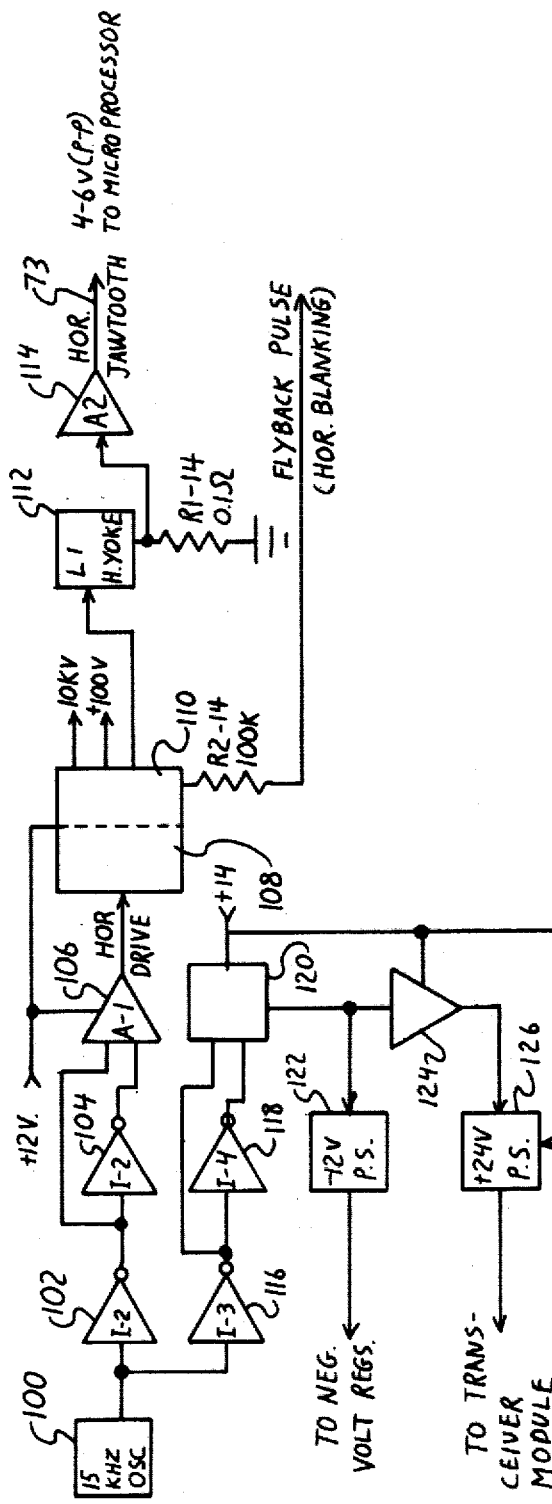
FIG. 14 is a schematic illustration of a horizontal sweep generator, positive high voltage source, and negative low voltage source for the fishscope of the present invention.

Continuing to refer to FIG. 14 and the horizontal sweep generator, it is seen that fly back transformer 110 is coupled to a horizontal yoke 112 and instead of being directly returned to ground, the same is returned to ground through a 0.1 ohm resistor R1-14. Resistor R1-14 converts the sawtooth yoke current to a sawtooth voltage at its junction with the yoke. This voltage is amplified by amplifier 114 and appears at the output terminal as a horizontal sawtooth signal of approximately 4 volts, peak to peak, for the operation and synchronization of a single microprocessor. In particular, the output voltage from amplifier 114 is directed through line 73 to the voltage comparators 70 and 72 shown in FIGS. 5 and 6 and already discussed hereinbefore.

Continuing to refer to FIG. 14, a second circuit is operatively associated with the 15–16 kHz master oscillator 100 for generating a negative voltage and a +25 volts. Reviewing this circuit, the same includes two TTL inverters 116 and 118 which drive a power switch 120 which in turn generates a square wave of 12 to 14 volts amplitude. The output of power switch 120 is directed to a capacitor-diode negative power supply 122 and is also connected to a push-pull emitter follower amplifier 124 which in turn drives a +25 volt capacitor-diode power supply 126. It is appreciated that the power supply 126 that generates the 25 volts is operative to supply this power to the transceiver module 16 discussed hereinabove and generally illustrated in FIG. 1.

VERTICAL SAWTOOTH GENERATOR AND YOKE AMPLIFIER

Figure 15:
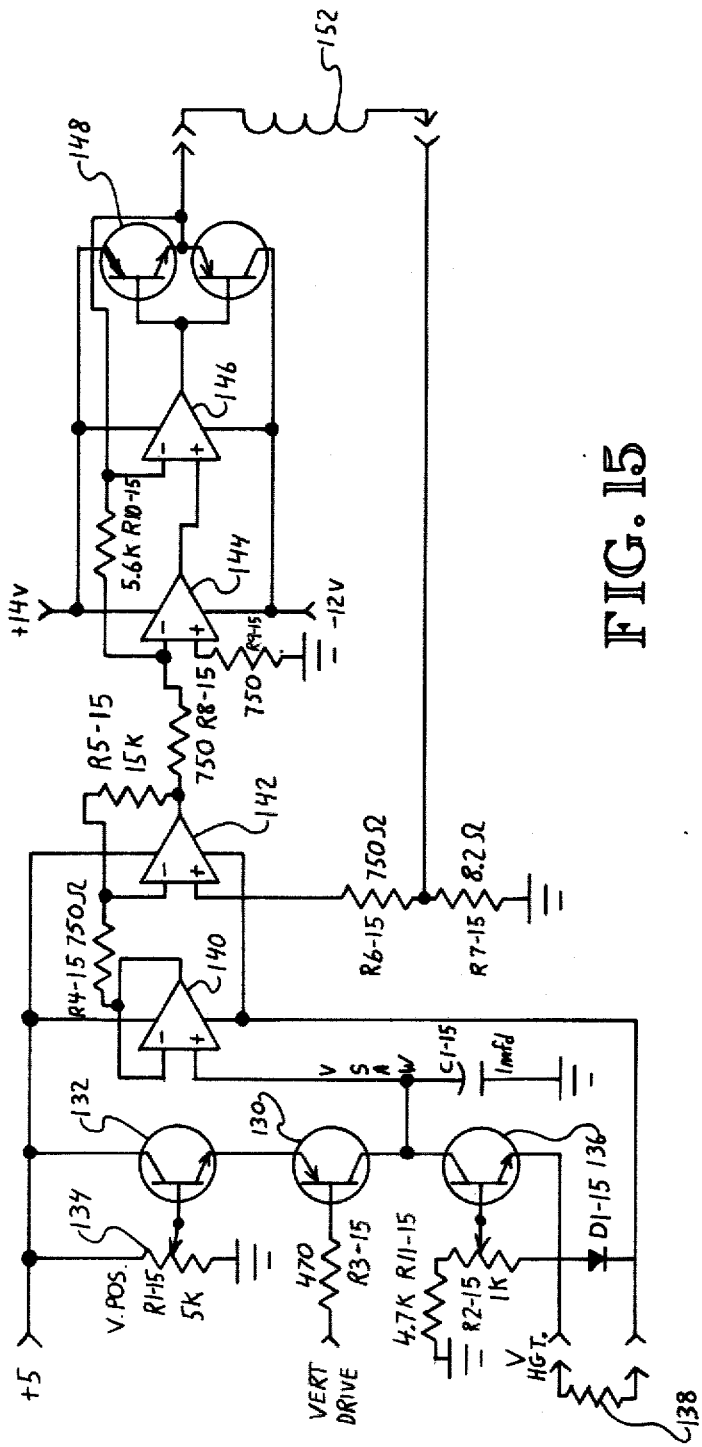
FIG. 15 is an electrical schematic illustration of the vertical yoke amplifier and sawtooth generator of the present invention.

With reference to FIG. 15, it is seen that the vertical sawtooth generator and yoke amplifier of the present invention is schematically illustrated therein.

To appreciate the significance of this part of the disclosure, one should appreciate that the frame time can vary between 12 millisec. and ½ second. This means that a direct coupled d.c. amplifier and sawtooth generator is required. In addition, because the vertical frame time can be short, that is 12 or 22 millisec. while the vertical frame period can be ½ second, this requires the yoke to be biased at its positive position for a relatively long period and released to scan negatively during a 12 or 22 millisec. interval.

In order to comply with these requirements, a sawtooth fly back switch 130 is referenced to a positive potential through a reference emitter follow amplifier 132. Again this part of the disclosure is illustrated in FIG. 15. So long as switch 130 is active, the potential across a sawtooth capacitor C1-15 is established by the vertical position control 134. Upon termination of the vertical drive pulse entering R3-15, the switch is deactivated and this allows sawtooth capacitor C1-15 to charge negatively through a constant current source amplifier 136, thereby generating a negative linear ramp signal at capacitor C1-15.

Capacitor C1-15 is charged and the charging current is determined by the base bias on amplifier 136 caused by R11-15, R2-15, D1-15 and emitter resistor 138. Resistor or resistors 138 are placed at various external switches which determine the vertical drive signals and are switched as the vertical drive signals are switched, thereby automatically establishing proper charging current for the vertical interval chosen. Resistor R2-15 is a potentiometer and in operation is utilized to adjust the vertical yoke current or height.

Appearing across capacitor C1-15 is a linear sawtooth voltage that is directed to a voltage follower amplifier 140 that acts to preclude loading and non-linearity. Amplifier 140 produces an output that is directed through resistor R4-15 to the inverting terminal of a second operational amplifier 142, that in this particular disclosure has a Gain of 20. The noninverting terminal of amplifier 142 is fed with a voltage corresponding to the yoke current developed across R7-15, thereby converting amplifier 142 to a differential amplifier. The differential signal appearing at the output terminal of amplifier 142 is directed to a third operational amplifier 144 inverting input terminal through resistor R8-15. Amplifier 144 in turn drives an output voltage follower amplifier comprising an operational amplifier 146 and two transistors 148 and 150. This voltage follower amplifier comprising operational amplifier 146 and transistors 148 and 150, drives vertical yoke 152.

As seen in FIG. 15, associated with the yoke amplification is a plurality of feed back loops that are directed to amplifiers 144 and 146 and which are essentially coupled to the emitters of transistors 148 and 150 instead of the chip output themselves. This is designed in this manner for two reasons. First, transistors 148 and 150 as oriented in the circuit have a combined junction drop of 1.4 volts which if unaccounted for would cause a discontinuity in the yoke current. By sensing emitter voltage for the feedback loop, the operational amplifier Gain goes maximum during the junction transistion period and causes the base drive to switch from 148 to 150 so rapidly no discontinuity is detected. Secondly, the feedback circuitry design speeds up amplifier response significantly.

THE VERTICAL DRIVE AND BLANKING GENERATOR-DEPTH READOUT CONTROL

Figure 16:
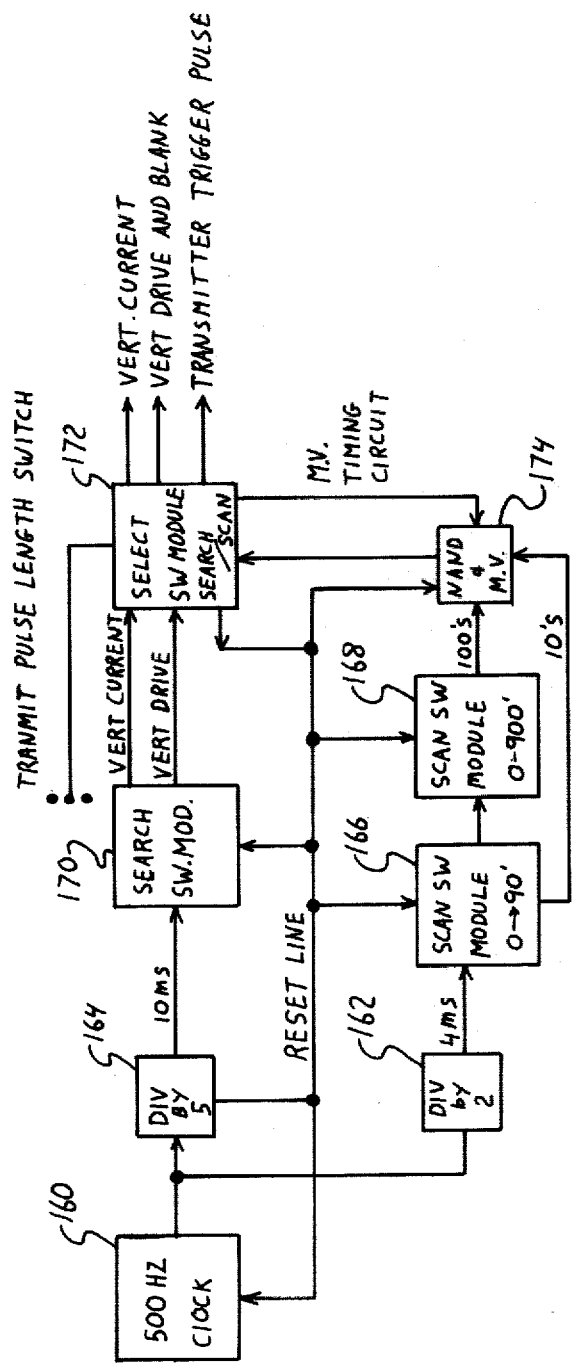
FIG. 16 is a schematic illustration of the search/scan timing module.

In FIG. 16, the subsystem illustrated includes two basic timing chains. The two timing chains are referred to as search and scan. Each search and scan mode derives times from a common clock and their respective circuits are actuated through a select or function switch.

Reviewing the system illustrated in FIG. 16, it is seen that the same includes a 500 Hz resettable clock 60 that is operative to drive a divide by two counter 162 and a divide by five counter 164. Divide by two counter 162 is operatively connected to a scan network including two tandem decade dividers 166 and 168 and their associated switches and logic. Divide by five counter 164 drives a five stage binary counter 170 allowing searching from 0-50-100-200-400-800 feet. These two independent counting chains are coupled to a select switch 172 that enables one to choose among four separate and distinct functions. These functions include a search function (0 to a selected search depth); search/2 function to search from one-half a selected search depth to the search depth; a function referred to as D+50 which entails scanning a depth of D+50 feet; and a final function D+25 which is from a selected scan depth to that depth plus 25 feet.

Select switch module 172 additionally generates a reset pulse (2 ms) which terminates the oscillator action and on release synchronizes it with its dependent counters. This precludes a anamolous counter action on turn-on.

The reset pulse on turn-off fires a second one shot multi-vibrator which generates the transmit pulse that is operatively directed to the transmitter-receiver module illustrated in FIG. 1. The transmit pulse of 200, 400, 600 usec duration, controlled by an external switch, activates the transceiver-transmitter causing the transmitter to generate wave trains or bursts of the same duration.

Describing the operation of the search-scan timing module shown in FIG. 16, in the scan mode of operation, on the termination of the reset pulse, the two decade counters 166 and 168 become active. Counter 166 is designed to count at 4 ms/step. On termination of the ninth step, it triggers counter 168 and returns to zero, thus ripple through clocking counter 168. Two switches are utilized to choose the desired count or depth and feed the outputs plus the reset pulse into a 3 input NAND Gate 174. When all inputs are positive at the scan depth, Gate 174 changes state and triggers an output one shot multi-vibrator. The time constant of this multi-vibrator is selected by a resistor on select switch 174 so as to be 10 millisec. (25 feet) or 20 millisec. (50 feet). This pulse is fed through a select switch module 172 to a vertical drive input terminal. The vertical charging current is determined by two resistors on select switch 172 to determine the proper vertical height for either setting. In the search mode, the search switch module 170 carries a 5-stage binary counter clocked at 10 ms, generating output signals of 10 ms, 20 ms, 40 ms, 80 ms and 160 ms. Upon termination of the chosen counter stage count, the reset multivibrator is activated which resets all counters to zero plus the oscillator for a period of 2 ms. To search from zero to 50, 100, etc., the reset pulse is chosen by the select switch to act as the vertical drive signal. The vertical changing current is controlled by another set of contacts and resistors on the search switch module 170 to keep the vertical height constant as the search interval is changed. To search from one-half search depth to full search depth, select switch module 172 causes outputs of the five search counters to become the vertical drive signals, thus integrating only the second half of the counter cycle. Select switch 172 now shifts the vertical current source switch to the next lower value resistor to double the vertical current and speed up the vertical deflection.

In the present disclosure, it is seen that certain values are shown for resistors, capacitors, and other components comprising the electrical circuitry of the present invention. It is noted such values may vary depending on the specific application, need, and performance requirements.

To basically summarize the present invention, the transmitter-receiver module 14 in cooperation with the transducer 18 emits sound wave trains that are reflected by certain target objects within a selected area. The reflected sound wave trains are received by the transducer 18 and the transmitter-receiver module 14 converts the same into electrical reproduction signals. These electrical reproduction signals are then directed to a microprocessor unit 14 where the converted signal is amplified and positive and negative voltage profiles are produced. These positive and negative voltage profiles are subjected to a voltage comparator circuit which compares the voltage profiles with a reference signal and then produces a video signal that is directed to the rastered format of the display module 10. The presence of target objects are then presented on the display module in the form of echo traces. Through the provision of what is preferred to as a search/scan module 12, the depth of the particular objects is detected and through various timing controls this search/scan module 12 is adapted to appropriately scale the echo traces on the display module according to depth and general location.

From the foregoing specification, it is appreciated that the fishscope of the present invention presents a new and unique system for generating echo traces, especially through the microprocessor 14 and the circuitry included therein. In addition, the fishscope of the present invention has numerous advantages over fishscopes of the prior art such as the ability to present multi-channel echo traces as well as the provision of presenting them either as black on white or white on black.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A sonic fishscope for detecting the presence and general location of fish or other target objects within a selected area, comprising: transducer means; a transmitter-receiver module operatively associated with said transducer means such that cooperatively said transmitter-receiver module and said transducer means generate and emit a sound wave train that is directed towards said selected area by said transducer means, and wherein the contact of said sound wave train with certain objects gives rise to a reflected sound wave train that is directed back to said transducer means wherein the reflected sound wave train is converted to an electrical reproduction signal by said transducer means and transmitted to said transmitter-receiver module; a microprocessor operatively associated with said transmitter-receiver module for receiving the electrical reproduction signals therefrom, said microprocessor including means for amplifying said electrical reproduction signals and for generating positive and negative voltage profiles therefrom, said microprocessors further including voltage comparator means for comparing said positive and negative voltage profiles with a reference signal and for generating a resulting output video signal which is compatible with a rastered display format; a display module operatively associated with said microprocessor for receiving said output video signals therefrom, said display module including a rastered display and wherein said output video signals are presented on said rastered display where the respective video signals appear as echo traces and generally indicate the presence and reflectivity of certain objects within the selected area; and means operatively associated with said transmitter-receiver module and said display module for effectively determining the depth of certain objects giving rise to said reflected sound wave trains, and for further indicating the appropriate depth of such detected objects on said rastered display of said display module.

2. The fishscope of claim 1 including a plurality of microprocessors operatively coupled to said display module for presenting a plurality of side by side traces on said rastered display thereof, whereby AZIMUTHAL detection may be accomplished as well as spectral analysis by viewing a plurality of transducer frequencies for a given area.

3. The fishscope of claim 1 including control means operatively associated with said display module for presenting a black on white display or a white on black display.

4. The fishscope of claim 1 wherein said display module includes a horizontal sweep and wherein said microprocessor reference signal is generated by a sawtooth signal generator referenced to the horizontal sweep of said display module, and wherein the generated sawtooth signal follows a general sawtooth profile.

5. The fishscope of claim 1 wherein said display module includes a dual axis yoke, a CRT, and fly back transformer means for supplying horizontal yoke deflecting current and for providing high voltage for said CRT.

6. The fishscope of claim 1 wherein said microprocessor is adapted to be selectively modified to present different and distinct traces or profiles.

7. The fishscope of claim 1 wherein said microprocessor includes detector-filter means for detecting the incoming signal profile after amplification and causing the same to appear as a uni-polarity signal.

* * * * *